US 11,416,368 B2

United States Patent
Parthasarathy et al.

(10) Patent No.: US 11,416,368 B2
(45) Date of Patent: Aug. 16, 2022

(54) CONTINUOUS SYSTEM SERVICE MONITORING USING REAL-TIME SHORT-TERM AND LONG-TERM ANALYSIS TECHNIQUES

(71) Applicant: Harness Inc., San Francisco, CA (US)

(72) Inventors: Sriram Parthasarathy, Fremont, CA (US); Raghvendra Singh, Fremont, CA (US); Parnian Zargham, Santa Clara, CA (US); Rishikesh Singh, Sunnyvale, CA (US); Jyoti Bansal, San Francisco, CA (US)

(73) Assignee: Harness Inc., San Francisco, CA (US)

( * ) Notice: Subject to any disclaimer, the term of this patent is extended or adjusted under 35 U.S.C. 154(b) by 282 days.

(21) Appl. No.: 16/690,137

(22) Filed: Nov. 21, 2019

(65) Prior Publication Data
US 2021/0157704 A1    May 27, 2021

(51) Int. Cl.
G06F 9/44 (2018.01)
G06F 11/34 (2006.01)
G06N 3/04 (2006.01)
G06F 11/30 (2006.01)
H04L 41/50 (2022.01)

(52) U.S. Cl.
CPC ........ G06F 11/3409 (2013.01); G06F 11/302 (2013.01); G06F 11/3065 (2013.01); G06N 3/04 (2013.01); H04L 41/5096 (2013.01)

(58) Field of Classification Search
None
See application file for complete search history.

(56) References Cited

U.S. PATENT DOCUMENTS

| | | | |
|---|---|---|---|
| 10,560,549 B1* | 2/2020 | Thomsen | H04L 67/10 |
| 2010/0005341 A1* | 1/2010 | Agarwal | G06F 11/3692 |
| | | | 714/38.11 |
| 2010/0218188 A1* | 8/2010 | Jackson | G06F 11/3419 |
| | | | 718/100 |
| 2016/0314064 A1* | 10/2016 | Moretto | G06F 11/3692 |
| 2020/0334122 A1* | 10/2020 | Shepard | G06F 11/3089 |

* cited by examiner

*Primary Examiner* — Qamrun Nahar
(74) *Attorney, Agent, or Firm* — Bachmann Law Group PC

(57) ABSTRACT

A system can monitor applications and analyze the metrics to determine if one or more of the applications are regressing or performing as expected. The metric analysis includes performing a first short term data analysis and, if data is not as expected, a second short term analysis based on machine learning-based pattern recognition machines. If the short-term analysis finds the metrics aren't as expected, a long-term analysis is performed. The long-term analysis can compare chunks of streaming metric data to cached metric blocks and historical data, and can include a concept drift analysis.

20 Claims, 13 Drawing Sheets

1100

Notification Settings

Alert Category
24/7 Service Guard

Alert Filter  ○ None  ● Matching  ○ Not Matching

Alert Type
24/7 Service Guard Alert

Application
× CV-Team-24x7-Test

Environment
× All

Service Verification(s)
× demo

Alert Threshold
0.5

User Group(s)
× Shaswat-Only

Submit

CONTINUOUS SYSTEM SERVICE MONITORING USING REAL-TIME SHORT-TERM AND LONG-TERM ANALYSIS TECHNIQUES

BACKGROUND

Software systems that provides web services, computing device operating systems, cellular phone and mobile device operating systems, and other software typically are executing 24 hours a day, 7 days a week. Current application performance management systems provide rule-based alerting. Rule based alerting is static and not flexible, which often times doesn't provide accurate information for dynamic data. What is needed is an improved method for monitoring dynamic data for software systems.

SUMMARY

The present technology monitors applications and analyzes the metrics to determine if an application is regressing or performing as expected. The metric analysis includes performing a first short term data analysis and, if data is not as expected, a second short term analysis based on machine learning-based pattern recognition machines. If the short-term analysis finds the metrics aren't as expected, a long-term analysis is performed. The long-term analysis can compare chunks of streaming metric data to cached metric blocks and historical data, and can include a concept drift analysis. The present technology uses sophisticated machine learning techniques to model good behavior and detect and flag anomalies In some instances, a method for automatically continuously monitoring an application receives, by an application on a server, data from a delegate on a remote machine, the delegate collecting data from a node within an application that is currently executing. A first comparison of the collected data to past data collected from the application is performed during a first period of time to determine if the application performance associated with the collected data is acceptable. A first analysis of the collected data by a pattern recognizing machine stored in memory of the server can be performed, wherein the first analysis performed based on an output of the pattern recognizing machine that is associated with performance of the application during the first period of time. A second comparison can be performed between the collected data to portions of data stored in memory and determined to be associated with unacceptable performance of the application during a second time period prior to the first period. The system can report a performance indication for the application based on the first comparison, the first analysis, and the second comparison.

In some instances, a system for automatically continuously monitoring an application can include a server including a memory and a processor, and one or more modules. The one or more modules stored in the memory and executed by the processor to receive, by an application on a server, data from a delegate on a remote machine, the delegate collecting data from a node within an application that is currently executing, perform a first comparison of the collected data to past data collected from the application during a first period of time to determine if the application performance associated with the collected data is acceptable, perform a first analysis of the collected data by a pattern recognizing machine stored in memory of the server, the first analysis performed based on an output of the pattern recognizing machine that is associated with performance of the application during the first period of time, perform a second comparison of the collected data to portions of data stored in memory and determined to be associated with unacceptable performance of the application during a second time period prior to the first period, and report a performance indication for the application based on the first comparison, the first analysis, and the second comparison.

BRIEF DESCRIPTION OF FIGURES

FIG. 11 is a screenshot of an interface for generating alert notification settings.

DETAILED DESCRIPTION

The last decade saw the dawn of a new generation of Application Performance Monitoring (APM) platforms. These APM platforms instrument service code to identify various application performance metrics across web transactions, business transactions, database calls, and third-party API calls. The metrics are measured continuously and aggregated into time buckets and indexed for analysis and dashboarding. Together, these metrics can be mined to provide an excellent snapshot of the current service state and can be used to predict near future behavior of the service.

The present technology monitors applications and analyzes the metrics to determine if an application is regressing or performing as expected. The metric analysis includes performing a first short term data analysis and, if data is not as expected, a second short term analysis based on machine learning-based pattern recognition machines. If the short-term analysis finds the metrics aren't as expected, a long-term analysis is performed. The long-term analysis can compare chunks of streaming metric data to cached metric blocks and historical data, and can include a concept drift analysis.

Data is reported based on a determination as to whether the streamed data metric is as expected and/or within a tolerance of the one or more short term analysis or long-term analysis. Reporting, in some instances, is done for the application as a whole.

Figure 1:
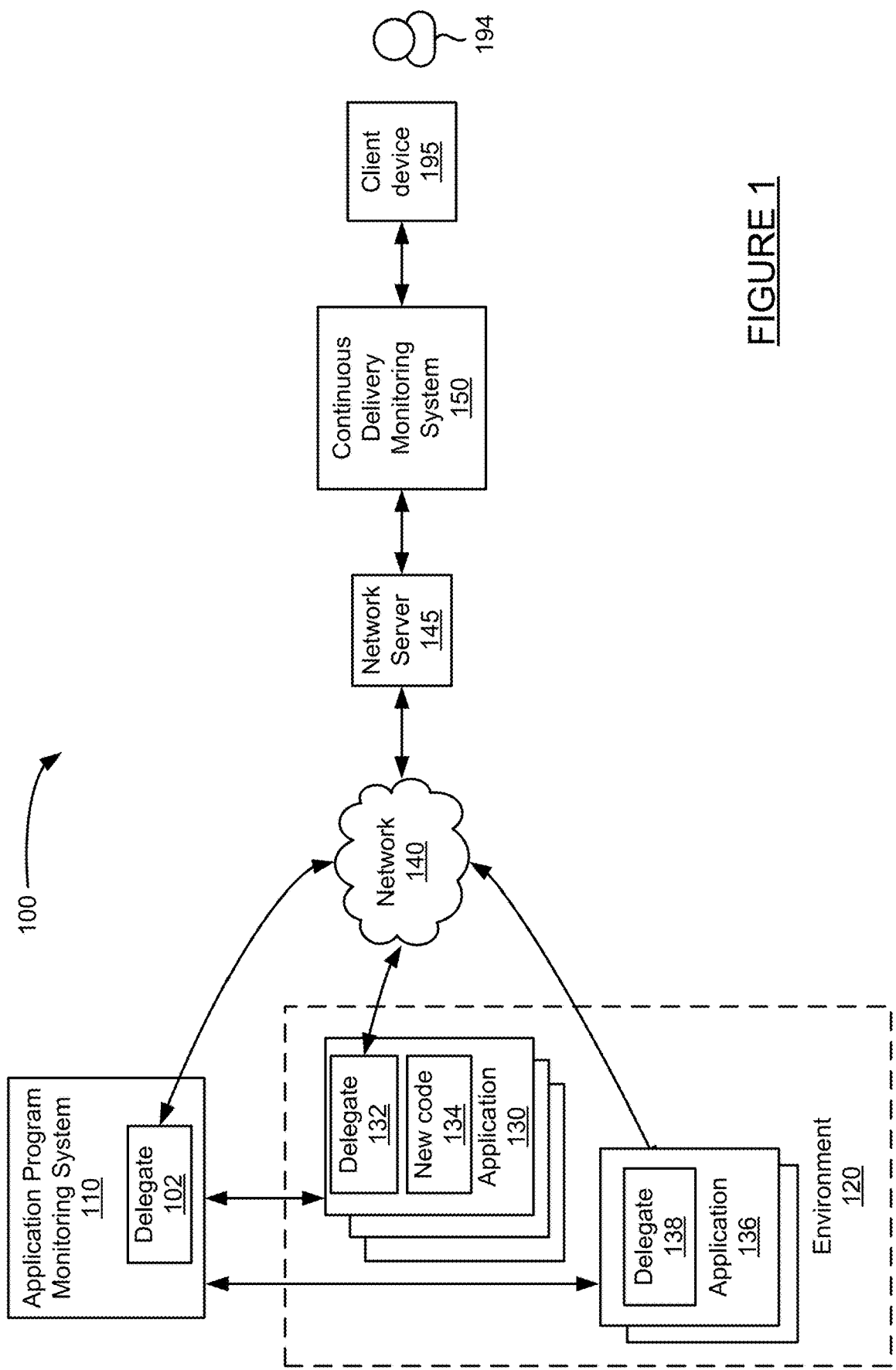
FIG. 1 is a block diagram of a system for providing continuous delivery and service regression detection in real-time for application performance metrics.

FIG. 1 is a block diagram of a system for providing continuous delivery and service regression detection in real-time for application performance metrics. The block diagram 100 of FIG. 1 includes application program monitoring system 110, environment 120 having application 130 and application 136, network 140, network server 145, continuous delivery monitoring system 150, and client device 195.

Environment 120 may include one or more machines or servers, including mobile devices, client devices with applications and network browsers, servers, and other machines (not illustrated in FIG. 1) at which applications 130 and 136 may be executing. The changes to software may be applied to the one or more applications on servers within environment 120. For example, within application 130, new code 134 may be installed onto application 130.

Network 140 may include one or more private networks, public networks, intranets, the Internet, an intranet, wide-area networks, local area networks, cellular networks, radio-frequency networks, Wi-Fi networks, any other network which may be used to transmit data, and any combination of these networks.

Continuous delivery monitoring system 150 may detect service regression in the performance or behavior of one or more applications within environment 120 in real-time, and before or after a software update 134 is delivered to application 130. To detect service regression, monitoring system 150 may monitor the applications either directly through delegates installed on the applications themselves, such as delegates 132 and 138, or by access to real-time streaming monitoring data (including metrics or other data) provided by application program monitoring system 110, for example via delegate 102.

A delegate may include an agent or other code that is installed to an application or system (e.g., host) and can communicate with remote systems and applications such as continuous delivery monitoring system 150. Each delegate may receive instructions and tasks from monitoring system 150, retrieve information and transmit the information periodically or based on other events to monitoring system 150, may install new code or update code on an application or system, and perform other tasks and operations. In some instances, delegate 102 may be installed on an application program monitoring system, such as a monitoring system provided by AppDynamics, Inc., of San Francisco Calif., to retrieve and transmit a stream of application performance metrics to delivery monitoring system 150. In some instances, delegates may be provided on one or more servers of an environment 120, such as servers hosting application 130 and application 136, to monitor applications and servers that include new code 134 and those that did not host any new code (e.g., control servers).

Network server 145 may receive requests and other transmissions on behalf of monitoring system 150 received over network 140. In some instances, network server 145 may process the request or transmission sore for them to monitoring system 150 for handling. Network server 145 may be implemented on monitoring system 150 or implemented separately, either logically or physically, from system 150.

Continuous delivery monitoring system 150 may provide continuous monitoring of a system. The system may receive an upgrade or change in code, or not be the recipient of an upgrade or new code. The continuous delivery system can determine if there are any immediate or near-term issues, such as performance regression, and may provide reports and alerts based on the determination(s). The continuous delivery monitoring system 150 may include a manager that manages tasks associated with the monitoring, utilization modules, clustering modules, a data store and other functionality. More details for a continuous delivery monitoring system are discussed with respect to FIG. 2.

As monitoring system 150 provides continuous delivery and monitoring of new code, it may provide updates, alerts, notifications, and other information through a user interface to a user 194. The updates may be provided through a user interface provided within a network browser, such as a web browser, an output from one or more mobile applications, or some other output of a client device 195. Client device 195 may be implemented as any computer that can receive and provide reports, such as a user interface or dashboard, via a network browser on a mobile device, smart phone, tablet, or any other computing machine.

Figure 2:
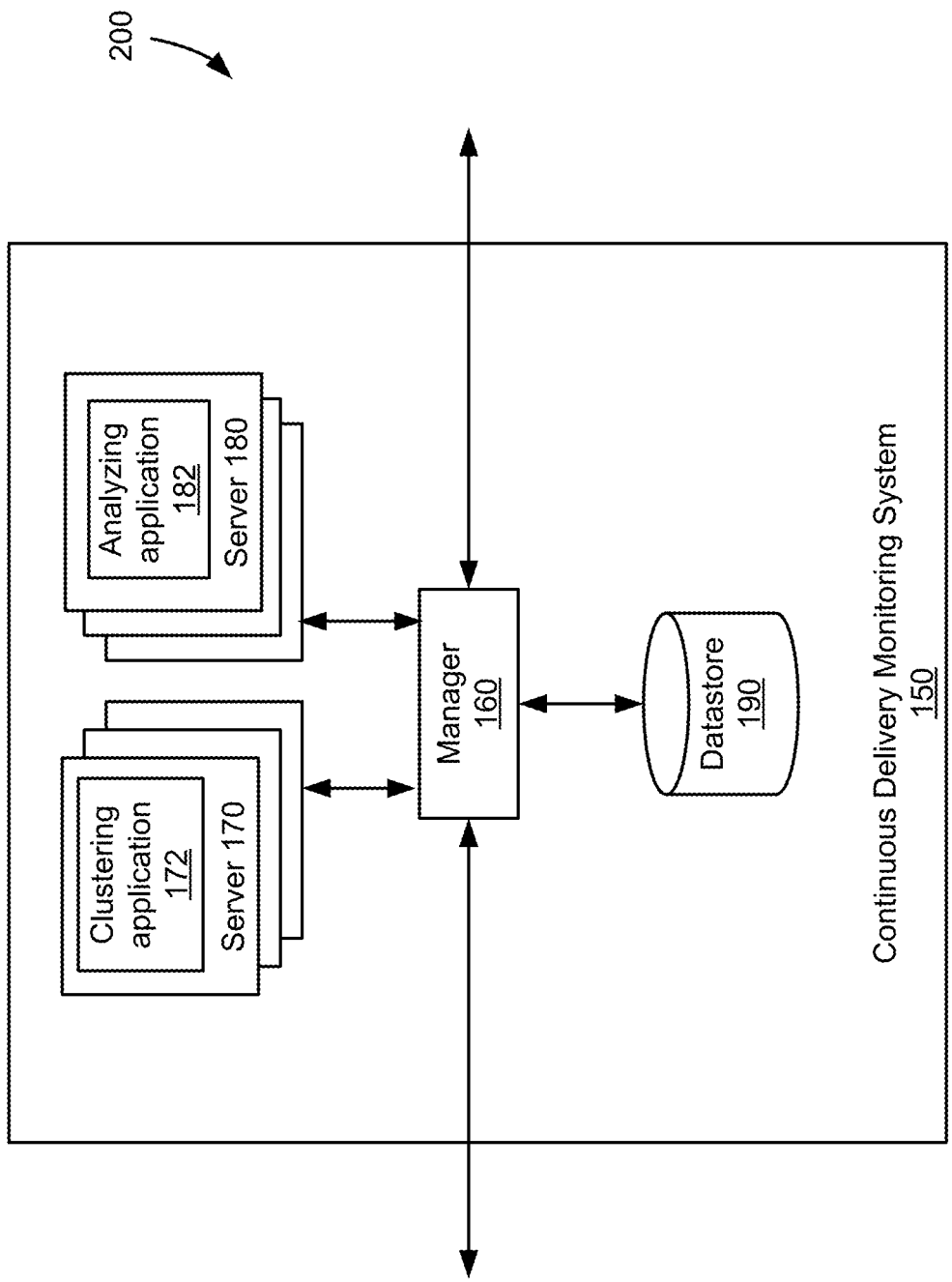
FIG. 2 is a block diagram of a continuous delivery monitoring system.

FIG. 2 is a block diagram of a continuous delivery monitoring system. The block diagram of FIG. 2 provides more detail of continuous delivery monitoring system 150 illustrated in FIG. 1. Continuous delivery monitoring system 150 includes manager 160, servers 170 and 180, and data store 190. Manager 160 may communicate with delegates 102, 132, and 138, provide them with tasks, instructions, and updates. For example, manager 160 can receive data from a delegate such as metrics, log information, time series data, and other data, initiate data analyzing and clustering, process data at data store 190, and report information to client device 195 for user.

Server 170 may include clustering application 172. In some instances, manager 160 may provide learned representations of real-time metric data to clustering application 172 for clustering. The data may be clustered based on similarity, probability, and/or other information as described elsewhere herein.

Server 180 includes analyzing application 182. Analyzing application 182 may analyze clustered and raw data provided by manager 160 and/or 172 to identify anomalies, service regressions, predict future behavior, and other analysis.

Data store 190 may communicate with manager 160 and may be used to persist time series data streams received by manager 160.

Figure 3:
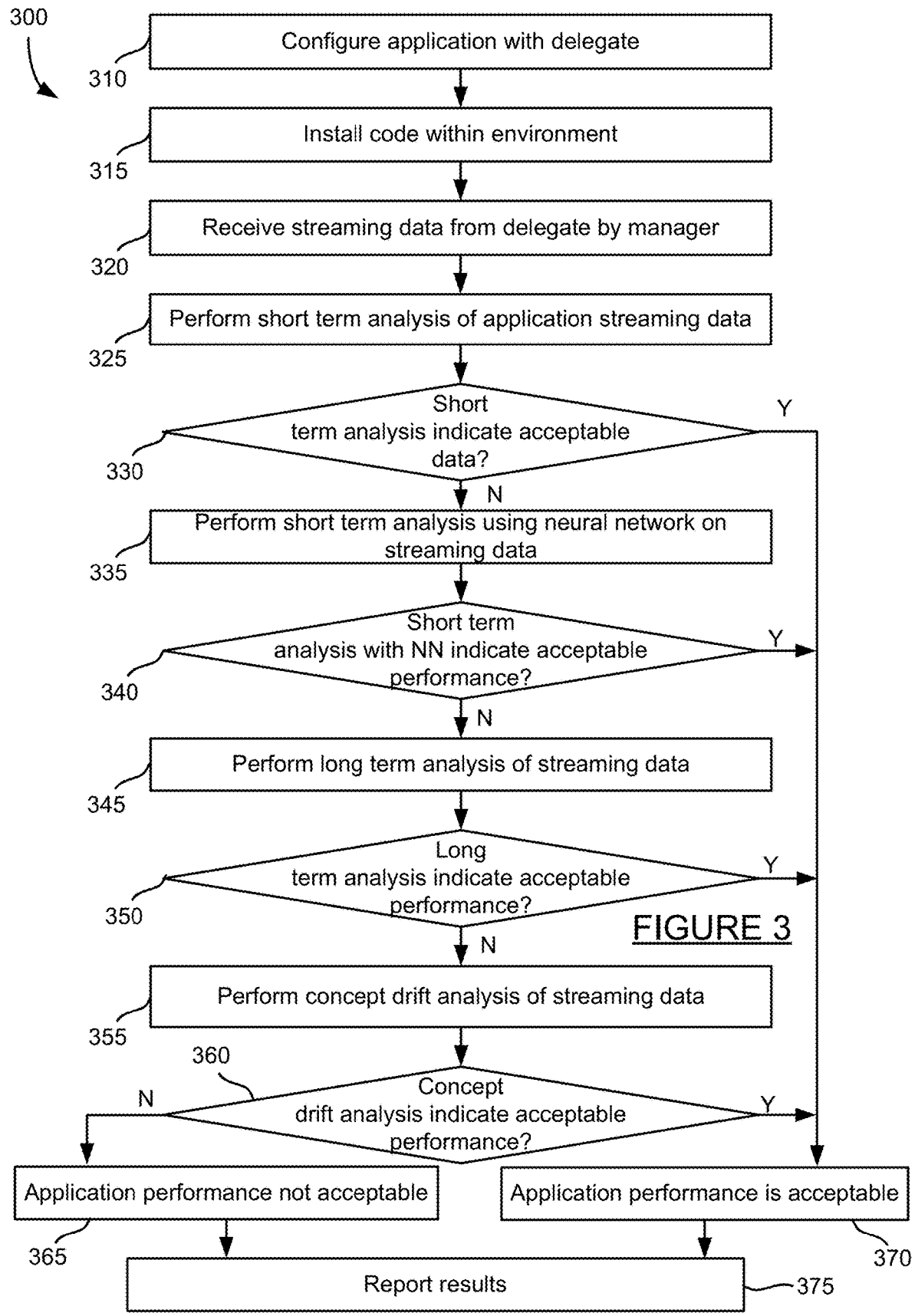
FIG. 3 is a method for providing continuous delivery system monitoring.

FIG. 3 illustrates an overview of a method for monitoring a continuous delivery system. FIGS. 4-9 provide more detail for portions of FIG. 3.

FIG. 3 is a method for providing continuous delivery system monitoring. An application to be monitored may be configured with a delegate at step 310. Configuring an application with a delegate may include installing the delegate to the particular application (e.g., host). The configuration may also include configuring the delegate with which data to capture, which managers (e.g., servers and applications) to communicate with, and other configuration tasks.

In some instances, code may be installed within an environment 120 at step 315. The installed code can update one or more applications within the environment. In some instances, the software update from the installed code may be installed in a portion of applications or nodes to enable an analysis as to whether the updated applications, or nodes, that include the software update behave differently than the applications/nodes without the update. For example, for a given number of nodes that a software update might apply to, only 5% of the nodes may initially be updated with the software update to determine if the nodes operate as expected with the update. The remainder of the nodes/applications may be updated in phases or in some other fashion.

The timing of 315 can vary. For example, code may be installed within the environment before or after a short-term analysis at step 325, before or after the short-term analysis using neural networks at step 335, and before or after a long-term analysis is performed at step 345. As such, an analysis as discussed with respect to the method of FIG. 3 may be performed before or after code is installed within the environment.

Streaming data may be received by a manager module from the delegate at a remote machine at step 320. Receiving the streaming data may include initial communications between the manager and the delegate, followed by transmission of the data from the delegate to the manager. The streaming data may include timeseries data, log data, and/or other data.

A short-term analysis of the application streaming data is performed at step 325. The short-term analysis may include comparing chunks of the streaming data to one or more blocks of historical streaming data received by the manager module or application over a period of time. The historical data may be data associated with a relatively short period of time, such as for example the last 120 minutes. More detail for performing a short-term analysis of the streaming data is discussed with respect to the method of FIG. 4.

A determination is made as to whether the short-term analysis indicates the data chunk of the streamed data is acceptable at step 330. With respect to the short-term analysis, data may be acceptable if an analysis of the data does not indicate that the performance of an application is regressing, or the data chunk matches historical data within a certain tolerance (see FIG. 4). If the short-term analysis determines that the most recent chunk of the streaming data is acceptable data, then the method of FIG. 3 continues to step 370 where the application performance is determined to be acceptable.

If the short-term analysis indicates that the received streaming data is not acceptable, a second short-term analysis using neural networks is performed on the received streaming data at step 335. The short-term analysis using the neural networks involves training a prediction system such as a neural network. Training can include providing a number of inputs into a neural network, the network may reduce the number of inputs, process the reduced input using a function, such as for example a cost function, and then reconstruct the input as an output. The output is then compared to the input to create an error profile.

After the neural network is trained and an error profile is constructed, the trained network is used to predict bad data such as anomalies. The suspect chunk of data is passed into the trained network as input. The data is processed, the number of inputs is reduced, the resulting data is processed using a function such as a cost function, and an output is constructed from the output of the cost function. The output is compared to the input, and the resulting error from the comparison is compared to the error profile from training to determine if the streaming data is acceptable based on the comparison of the error function. More detail for analyzing the streaming data using a neural network is discussed with respect to the method of FIG. 5.

If the short-term analysis with the neural networks indicate that the performance associated with the streaming data is acceptable, the method of FIG. 3 continues to step 370 were the application performance is deemed acceptable.

If the short-term analysis using the neural networks indicates the data is not unacceptable, a long-term analysis is performed on the streaming data at step 345. A long-term analysis may include comparing chunks of recently received streaming data to previously received streaming data determined to be undesirable data. A long-term analysis may also include performing a historical data comparison on the recently received streaming data. More detail for performing a long-term analysis of the recently received streaming data is discussed with respect to method of FIG. 6.

A determination is made as whether the result of the long-term analysis indicates that the streaming data is acceptable at step 350. If the streaming data indicates that the data is acceptable, and that the performance of the application associated with the streaming data is performing acceptably, the method of FIG. 3 continues to step 370 wherein the application performance is deemed acceptable.

If the long-term analysis results indicate the performance is not acceptable, a concept drift analysis can be performed for the streaming data at step 355. A concept drift analysis may determine if there is a shift in the streaming data values that should be considered an acceptable trend over a longer term. More details for performing a concept drift analysis is discussed with respect to the method of FIG. 8.

A determination is made as to whether the concept drift analysis indicates acceptable performance by the application providing the streaming data at step 360. If the concept drift analysis indicates acceptable performance, application performance is deemed acceptable at step 370 and results for the application performance are reported at step 375. If the concept drift analysis indicates that the performance is not acceptable, and the application performance is deemed to not be acceptable at step 365, results are reported accordingly at step 375. In some instances, results may be reported for the application as a whole, rather than for individual methods, objects, or other portions of an application. Reporting results is discussed in more detail with respect to the method of FIG. 9.

Figure 4:
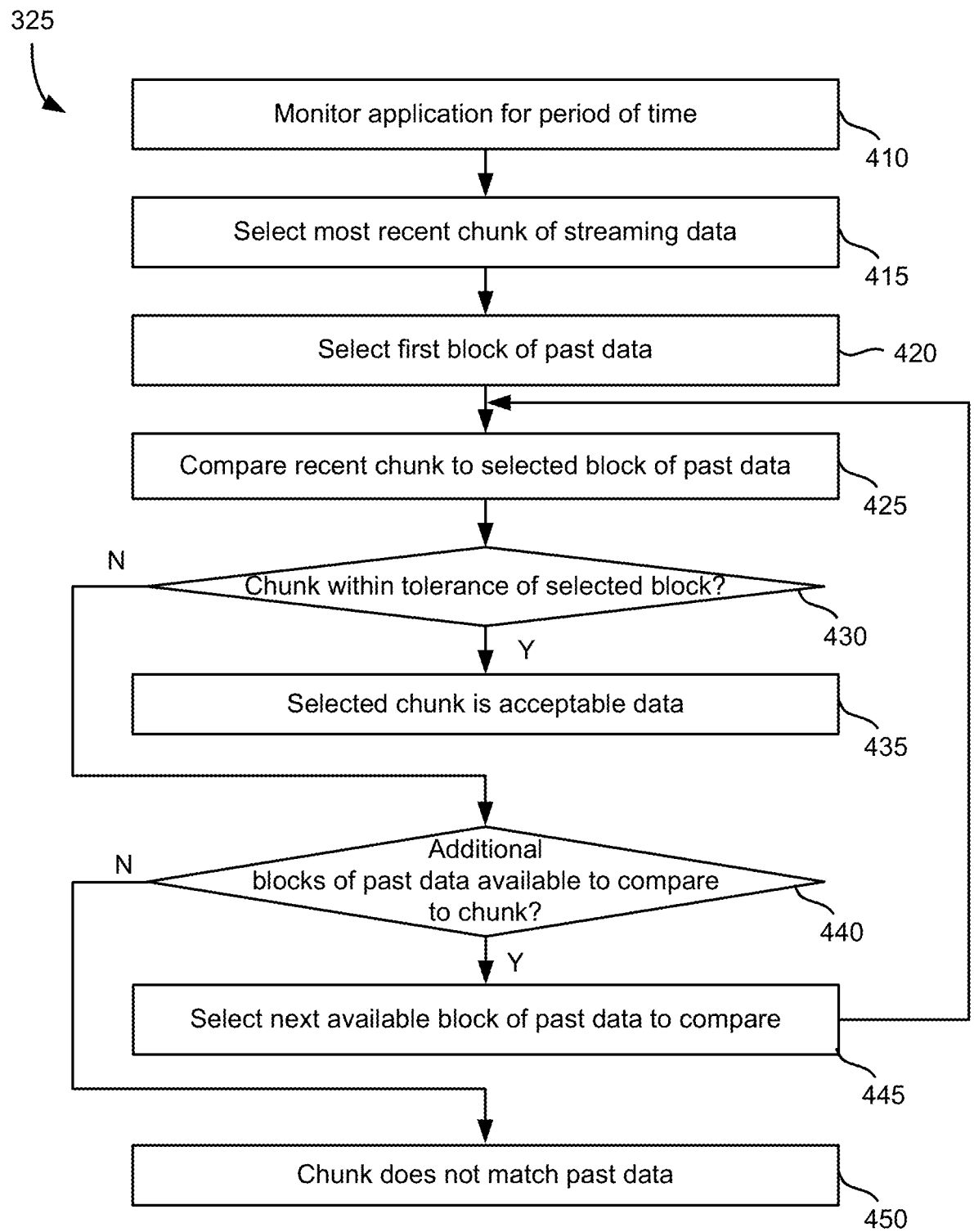
FIG. 4 is a method for performing a short-term analysis of application streaming data.

FIG. 4 is a method for performing a short-term analysis of an application streaming data. The method of FIG. 4 provides more detail for step 325 of the method of FIG. 3. An application may be monitored for a period of time at step 410. The period of time may be enough to establish a baseline of performance for the application, and/or collect a set of data over which one or more data patterns and behaviors (e.g., patterns or behaviors in the values of metrics associated with application performance and calculated periodically over the period of time) can be viewed. In some instances, the application may be monitored for a period of 15 minutes, 30 minutes, 60 minutes, 120 minutes, or some other period of time.

A recent chunk of streaming data received from a delegate monitoring the application is selected at step 415. In some instances, the most recent chunk may be the most recent 10, 15, or 20 minutes of metric data, or some other period of time of streaming data.

A first block of data collected during the monitoring but previous to the recent chunk of data is selected at step 420. In some instances, the first block may be the most recent 15 minutes of streaming data received just prior to the recent chunk for the period of time at step 410. Hence, if data has been collected for an application for 120 minutes, the recent chunk may be the most recent 15 minutes, and the first block may be the data associated with 15-30 minutes back into the collected data.

The recent chunk is compared to the selected block of past data at step 425. In some instances, the past data is data collected while monitoring the application for a period of time at step 410, but modified to remove data that has been determined to be unacceptable. For example, if within the 120 minutes a portion of data between 15 minutes ago and 30 minutes ago was determined to be unacceptable, then the past data would include 105 minutes of data determined to be acceptable, and would not include the 15 minutes of data determined to be unacceptable.

In some instances, the comparison at step 425 may be performed using a moving window method, comparing the values of the recent chunk of data to the selected block of past data. A determination is made as to whether the chunk of data is within a tolerance of the selected block of data at step 430. In some instances, the tolerance may be within a first or second standard deviation, within a certain percentage such as 30% of the data within the selected block, or some other tolerance. In some instances, other pattern recognizing machines and/or probabilistic approaches can be used. If the chunk data is within a tolerance of the block data, the selected chunk is determined to be acceptable data at step 435.

If the chunk is not within the tolerance at step 430, a determination is made as to whether additional blocks are available to compare to the chunk at step 440. If additional blocks of the past data are available to compare, the next available block of past data is selected for comparison to the chunk and the method of FIG. 4 returns to step 425, where the selected block and the chunk are compared. If no additional blocks are available to compare, it is determined that the chunk does not match the past data according to a short-term analysis at step 450.

Figure 5:
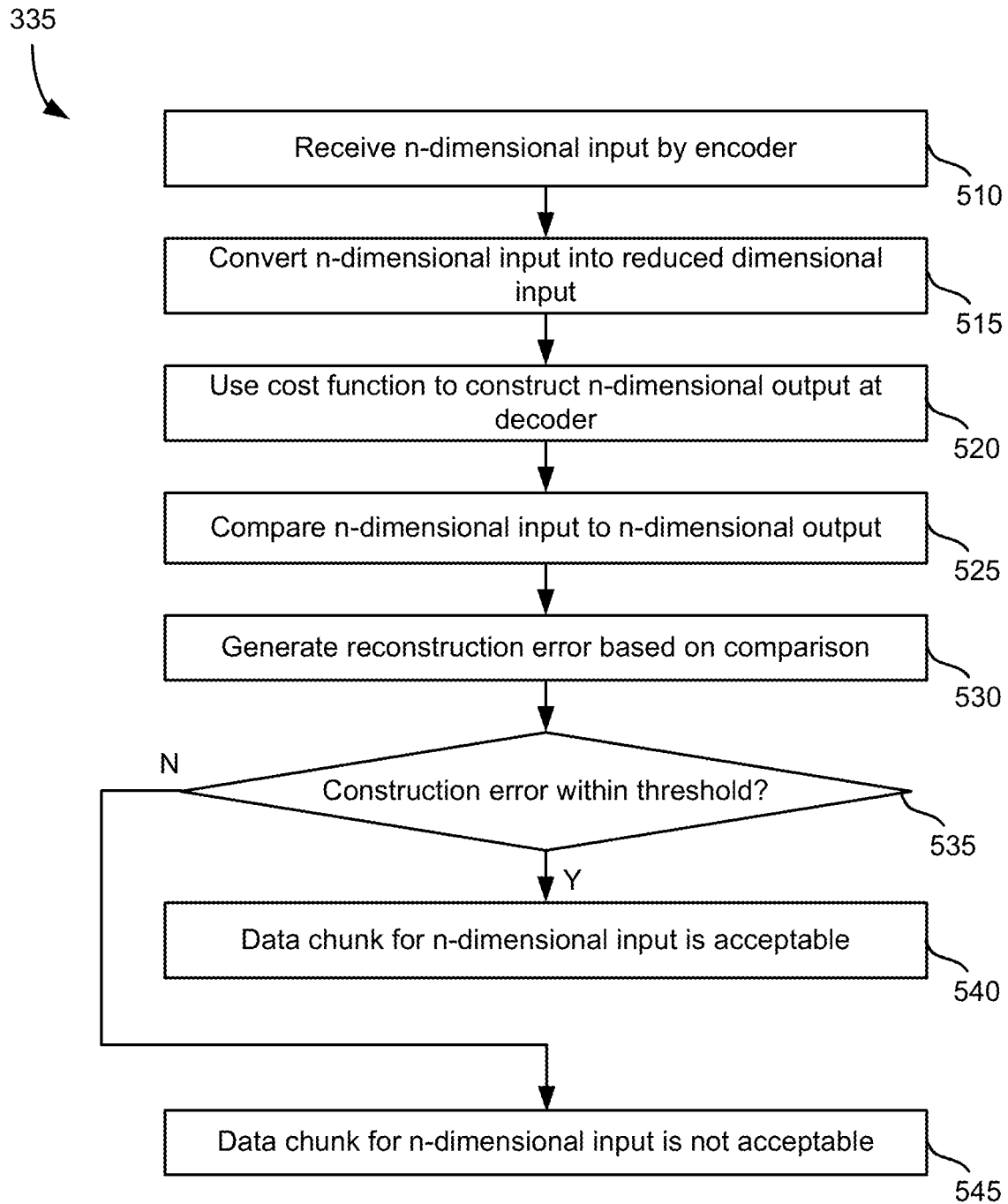
FIG. 5 is a method for performing a short-term analysis of application streaming data using neural networks.

FIG. 5 is a method for performing a short-term analysis of application streaming data using neural networks. The method of FIG. 5 provides more detail for step 335 the method of FIG. 3. First, an n-dimensional input is received by the encoder at step 510. The n-dimensional input may include streaming data, different metrics associated with an application, and/or other data associated with application performance. The n-dimensional input may then be converted into a reduced dimensional input at step 515. In some instances, neuron modules of the neural network are used to convert the n-dimensional input into a reduced dimensional input. In some instances, the input may be converted from a five-dimensional input into a three-dimensional input.

A cost function is applied to the reduced dimensional input, and the output is then used to reconstruct the n-dimensional input at step 520. The output n-dimensional output is then compared to the original n-dimensional input at step 525. A reconstruction error is then generated based on the comparison of the n-dimensional input and the n-dimensional output at step 530. The reconstruction error generated at step 525 is then compared to reconstruction errors generated from training data to determine if the construction error generated at step 525 is within a threshold at step 535. If the reconstruction error is within a threshold, the data chunk for the n-dimensional input is determined to be acceptable at step 540. If the reconstruction error is not within a threshold, the data chunk for the n-dimensional input is determined to be not acceptable at step 545.

In some instances, the short-term analysis of FIG. 5 may utilize a variational auto-encoder to process and ultimately reconstruct the n-dimensional input. The variational auto-encoder can map a high dimensional and complex input data to a latent space with a lower dimension. In some instances, the second short-term analysis may be performed at least in part by a machine other than a neural network. For example, other pattern recognizing machines could be used in place of an artificial neural network to generate a reconstruction error and determine if the data associated with the n-dimensional input is acceptable or not.

Figure 6:
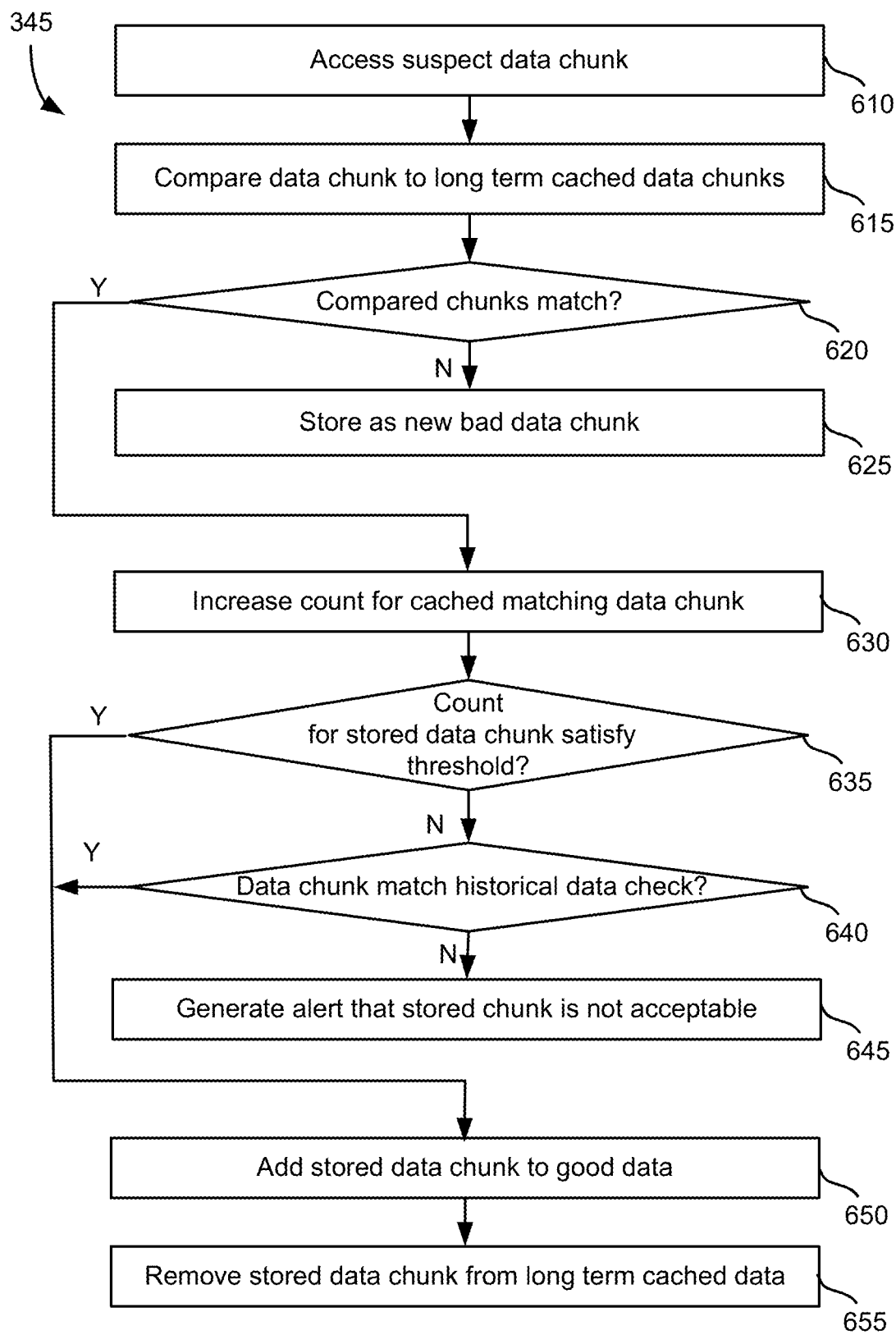
FIG. 6 is a method for performing a long-term analysis of streaming data.

FIG. 6 is a method for performing a long-term analysis of streaming data. The method of FIG. 6 provides more detail for step 345 of the method of FIG. 3. A suspect data chunk is accessed at step 610. The data chunk is compared to long-term cached data chunks at step 615. The long-term cached data chunks may include one or more data chunks previously identified as unacceptable data by a first short-term analysis and a second short-term analysis using machine learning.

A determination is made as to whether the suspect data chunk matches any long-term cached data chunks at step 620. If the compared chunks do not match, the suspect data chunk is stored as a new bad data chunk at step 625. If the compared data chunks match within a tolerance, such as for example within standard deviation or a percentage of the long-term data chunk, a count for the cached matching data chunk is increased at step 630.

A determination is made as to whether a count for the stored data chunk satisfies a threshold count at step 635. In some instances, the threshold count may include three, four, five, or some other number of matches. In some instances, if a data chunk stored in long-term cache is matched to suspect data chunks a certain number of times, then the cached data chunk is determined to be an acceptable data chunk and is added to "good data"—data used for comparison to streaming data for a short-term analysis. If the count for the stored data chunk satisfies a threshold, the store data chunk is added to the good data used to perform a short-term analysis at step 650. The store data chunk is then removed from long-term cached data at step 655.

Returning to step 635, if count for the long-term cached data does not satisfy the threshold, a determination is made as to whether the data chunk matches a historical data check at step 640. A historical data check compares the suspect data chunk with other data chunks that have matching or similar historical parameters. For example, the suspect data chunk may be compared to other data chunks that were streamed at the same time and on the same day of the week, at the same time on the same day of the month, or other data chunks having similar historical parameters. More detail for performing a historical data to is discussed with respect to the method of FIG. 7.

Figure 7:
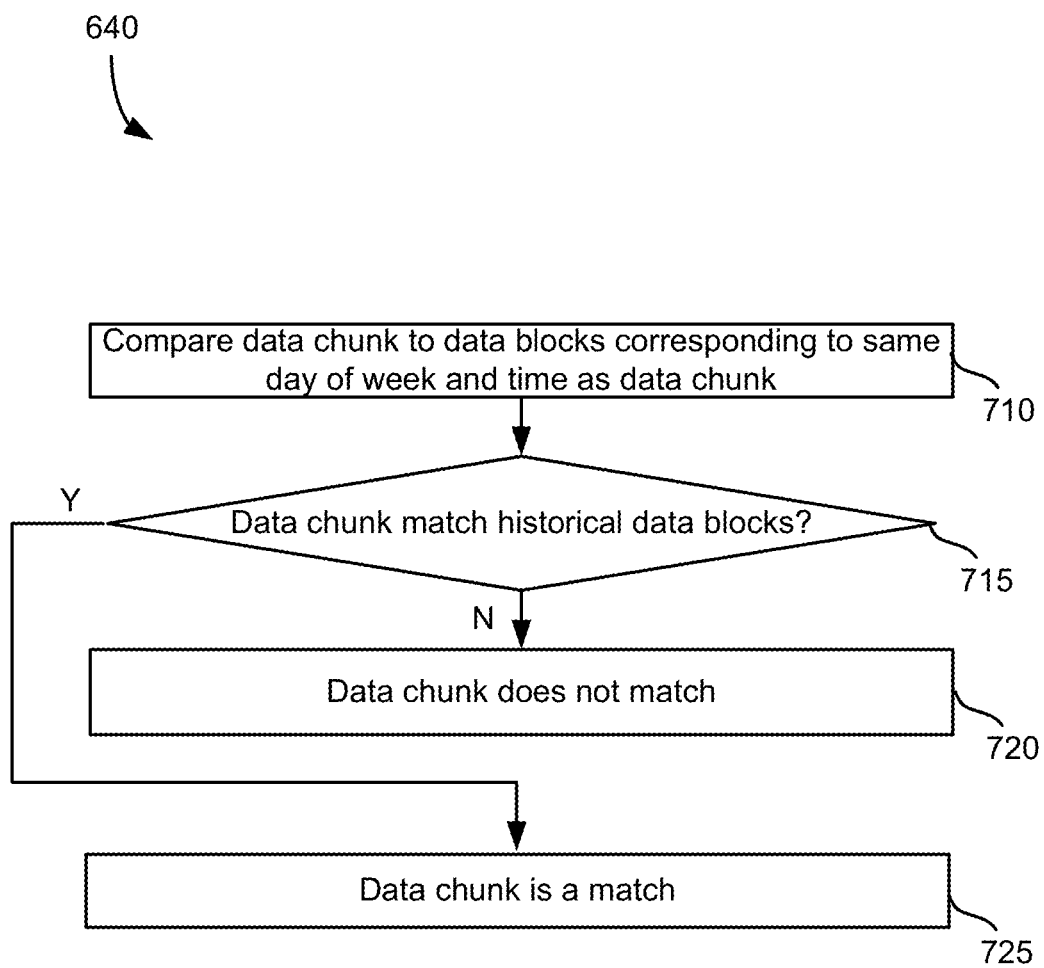
FIG. 7 is a method for performing a historical data check on a data chunk.

If the data chunk does match the historical data check, and the method of FIG. 6 continues to step 650 were the store data chunk is added to the good data. If the data chunk does not match the historical data check, an alert is generated that the stored data chunk is not acceptable at step 645. In some instances, the alert may be generated to inform an administrator that there is an unacceptable data chunk. The alert may directly or indirectly provide an interface to the administrator that allows the administrator to provide a response or input in response to the alert. In some instances, the administrator may provide input to accept the chunk as being unacceptable, or provide input to set the chunk as acceptable data, wherein the chunk is added to good data used to perform a short-term analysis of subsequent data chunks FIG. 7 is a method for performing a historical data check on a data chunk. The method of FIG. 7 provides more detail for step 640 the method of FIG. 6. First, a data chunk is compared to data blocks corresponding to the same day of week and time as the suspect data chunk at step 710. For example, if the suspect data chunk was collected between 10 AM and 10:15 AM on a Tuesday, the suspect data chunk is compared to previous streaming data collected on Tuesdays between 10 AM and 10:15 AM. In some instances, the data chunks may be compared to data chunks compared at the same time and day of the week, the same time and date of the month, or be compared against data chunks that otherwise have similar historical parameters.

A determination is made as to whether the data chunk matches the historical data blocks at step 715. If the data chunk matches a data block having similar historical parameters from previous data stream data, the data chunk is considered a match at step 725. If the data chunk does not match any historical data block, a determination is made that the data chunk does not match at step 720.

Figure 8:
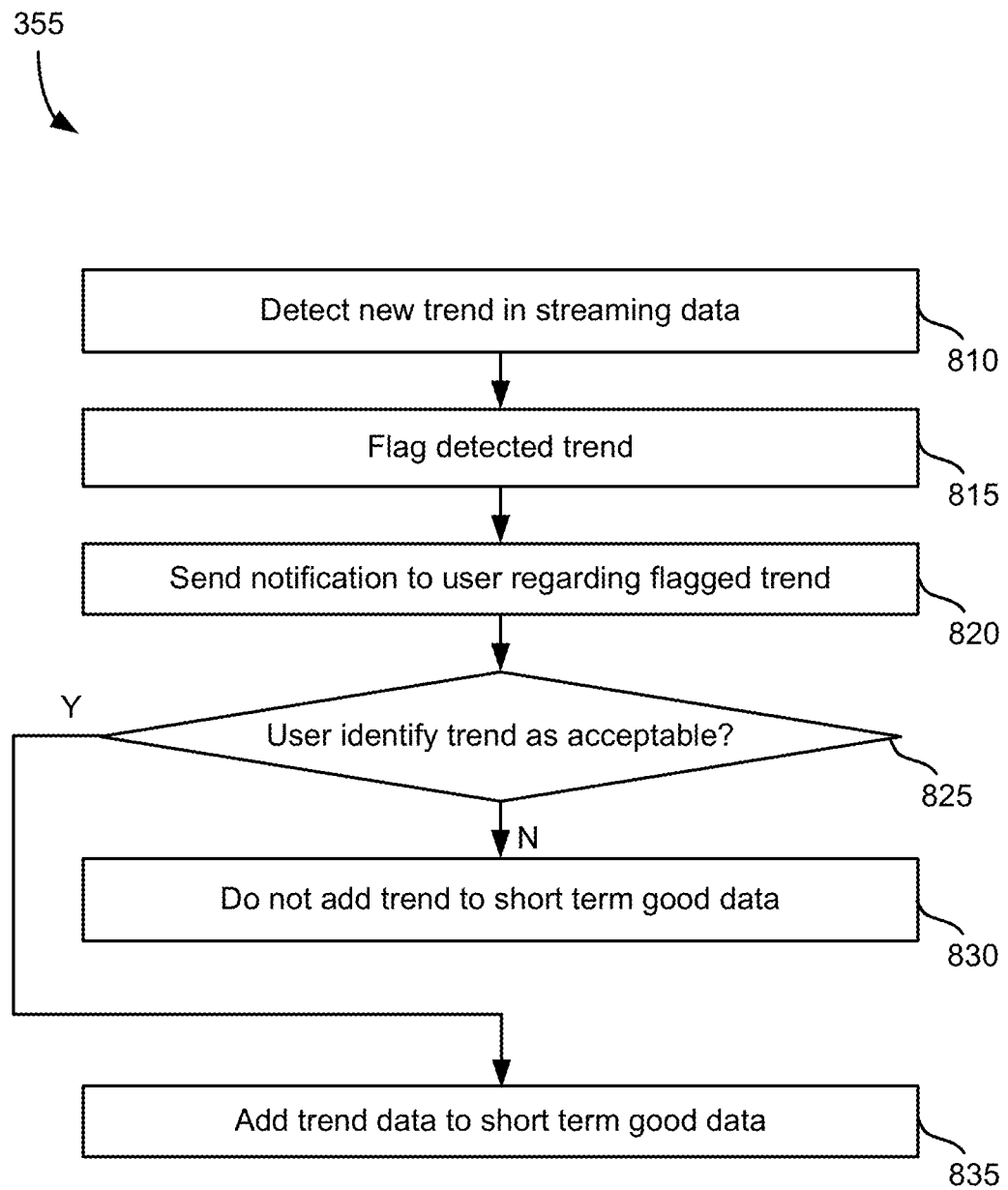
FIG. 8 is a method for performing a concept drift analysis of streaming data.

FIG. 8 is a method for performing a concept drift analysis of streaming data. The method of FIG. 8 provides more detail for step 355 of the method of FIG. 3. First, a new trend is detected in streaming data at step 810. The new trend may include an overall upward trend in value, and overall downward trend in value, or some other trend that affects subsequent streaming data values. The detected trend is flagged at step 815. A notification may then be sent to an administrator or user regarding the trend at step 820.

In response to sending a notification to the user, the user may be provided with an interface, directly or indirectly, for the user to indicate whether the trend is acceptable or unacceptable. In some instances, the notification to the user may include one or more of changes in values, graphical indications of the trend, text, and/or other data. If the user identifies the trend is acceptable at step 825, the trend data is added to short-term good data and can be used for short-term analysis at step 835. If user identifies the trend as not acceptable, or does not respond to the notification, the trend is not added to the short-term data at step 830 and will not be added to data use perform short-term analysis.

Figure 9:
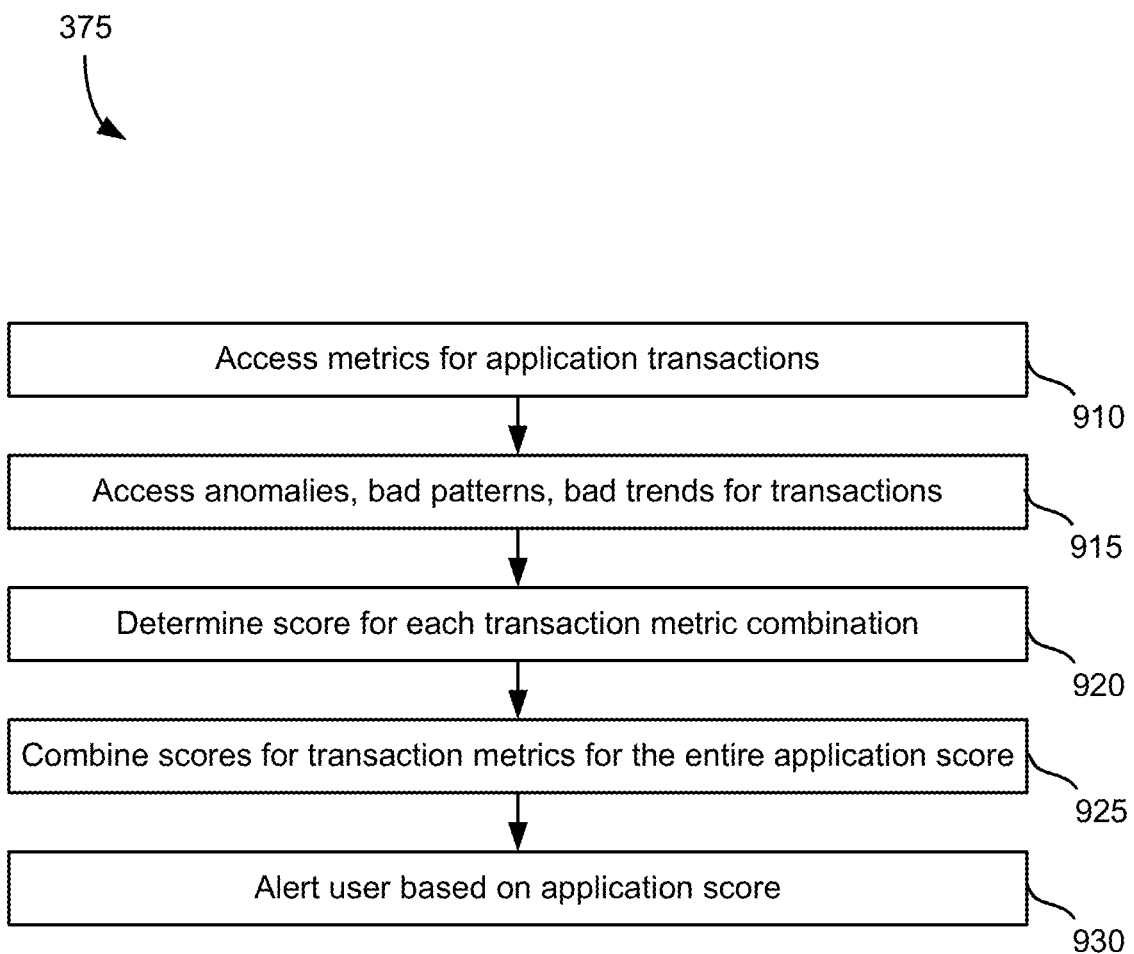
FIG. 9 is a method for reporting information for an application.

FIG. 9 is a method for reporting information for an application. The method of FIG. 9 provides more detail for step 375 of the method of FIG. 3. Metrics may be accessed for application transactions at step 910, the metrics may include response time, error rate, and other metrics for timeseries data, metrics for streaming log data.

Anomalies, patterns, and trends are accessed for the transactions at step 915. A score is determined for each transaction-metric combination at step 920. For example, a score may be determined for each metric for a particular transaction. Hence, if three transactions each have three metrics, nine transaction-metric scores may be determined at step 920. In some instances, the scores may range from 0 to 1, wherein a value of one indicates no anomalies, bad patterns, or bad trends, and a value of zero indicates only anomalies, bad patterns, or bad trends.

The scores may be combined for transaction metrics for the entire application to determine an application score at step 925. In some instances, the scores for the transaction metrics may be averaged to determine the application score. In some instance, certain anomalies, patterns, and trends which are undesirable may be weighted to affect the overall application score. As a result, some bad patterns may significantly reduce the application score while other patterns may not significantly reduce the application score.

A user alert is generated based on application score at step 930. In some instances, the alert is generated if the application score satisfies a threshold, such as for example a value of 0.5 or lower. In some instances, an alert may be generated if the application score does not satisfy the threshold set by a user or administrator of the system. The alert may indicate the score, a link to an interface with more information, a text or electronic message, or some other alert.

In some instances, a risk threshold may be setup for alerting. For example, a risk score may be calculated to be between 0 and 1. Different types of alerts ay be generated for different alert scores. For example, an alert may be generated for a score that is greater than 0.5. A score between 0.5-0.6 can be configured to generate an alert that is sent via email, a score of 0.6-0.8 can cause an alert to be sent to a work messaging system, such as "SLACK", and a score greater than 0.8 may cause an alert to go to an administrator pager.

Figure 10:
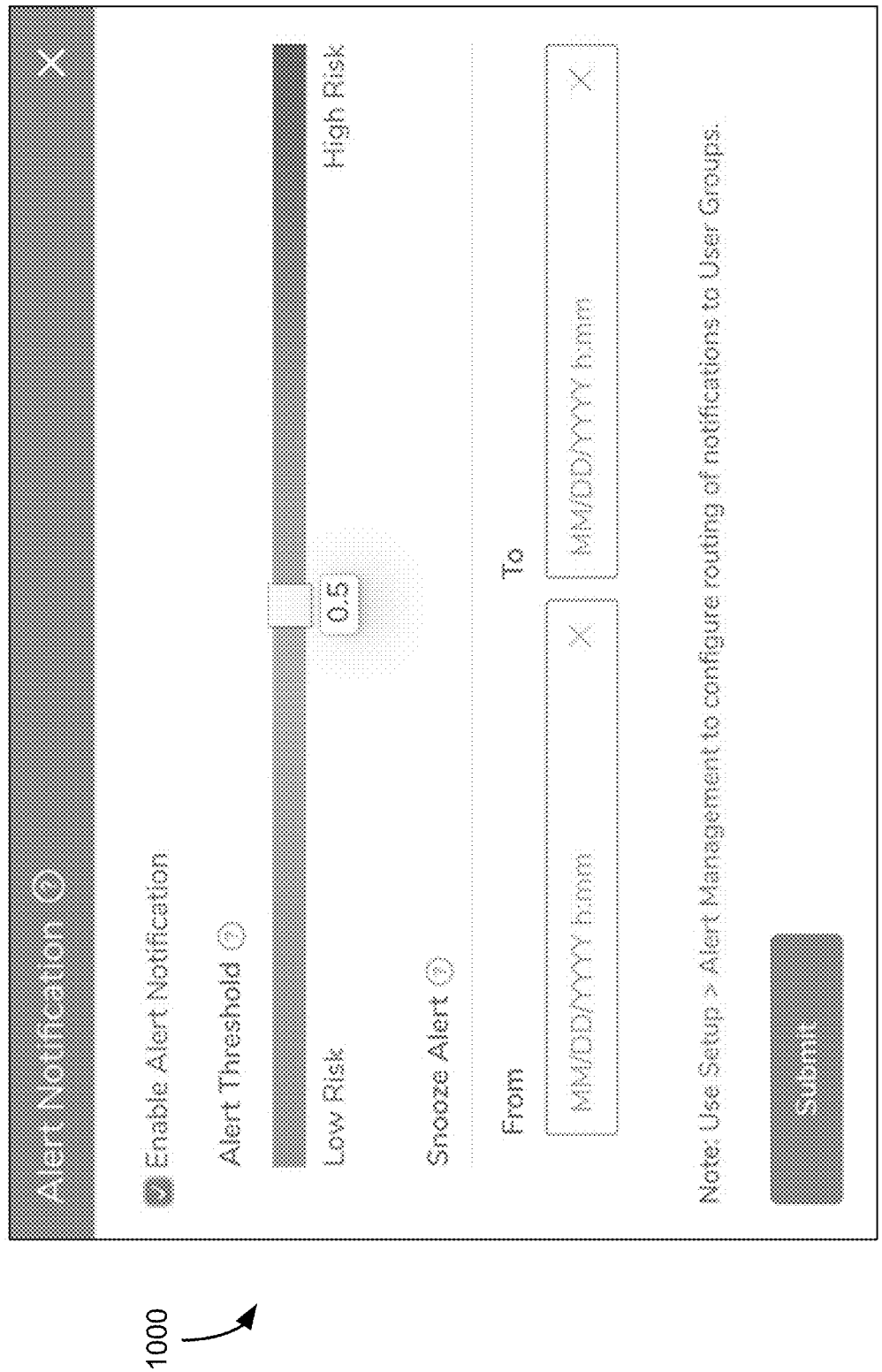
FIG. 10 is a screenshot of an interface for generating an alert notification.

FIG. 10 is a screenshot of an interface for generating an alert notification. The interface 1000 of FIG. 10 allows a user to set an alert threshold using a slide bar. The slide bar is currently set to a value of 0.5. The interface also allows the user to indicate a beginning date and time and ending date and time during which alerts that satisfy the current alert should be generated.

FIG. 11 is a screenshot of an interface for generating alert notification settings. Interface 1100 of FIG. 11 allows a user to set a category, alert type, application, environment, and service verification for the current alert. The user may also indicate a user group for the current alert, and adjust the alert threshold using a slide bar. In interface 1100, the settings for the current alert are set to an alert category of 24/7 service guard, an alert type of 24/7 service guard alert, an application of CV-Team 24×7—test, all environments, and service verifications of "demo." The user group is designated as "shaswat-only."

Figure 12:
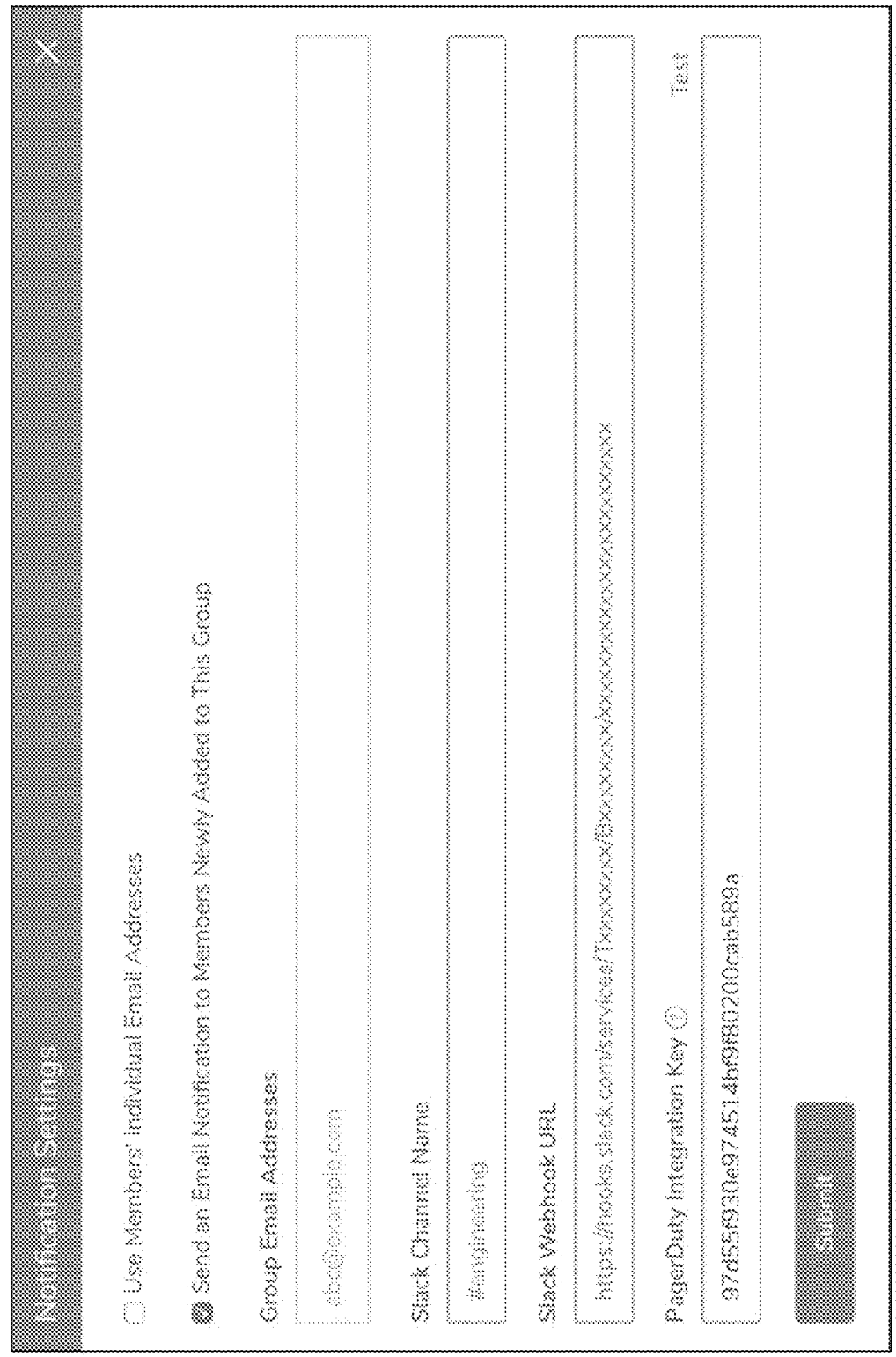
FIG. 12 is a screenshot of another interface for generating alert notification settings.

FIG. 12 is a screenshot of another interface for generating alert notification settings. The interface 1200 of FIG. 12 allows a user to indicate if they like to use members' individual email addresses (e.g., via a checkbox), and allows a user to indicate if email notifications should be sent to members newly added to the group associated with the alert (e.g., via checkbox). Interface 1200 also includes settings for slack channel name or other messaging application name, slack webhook URL, and page duty integration Key.

Figure 13:
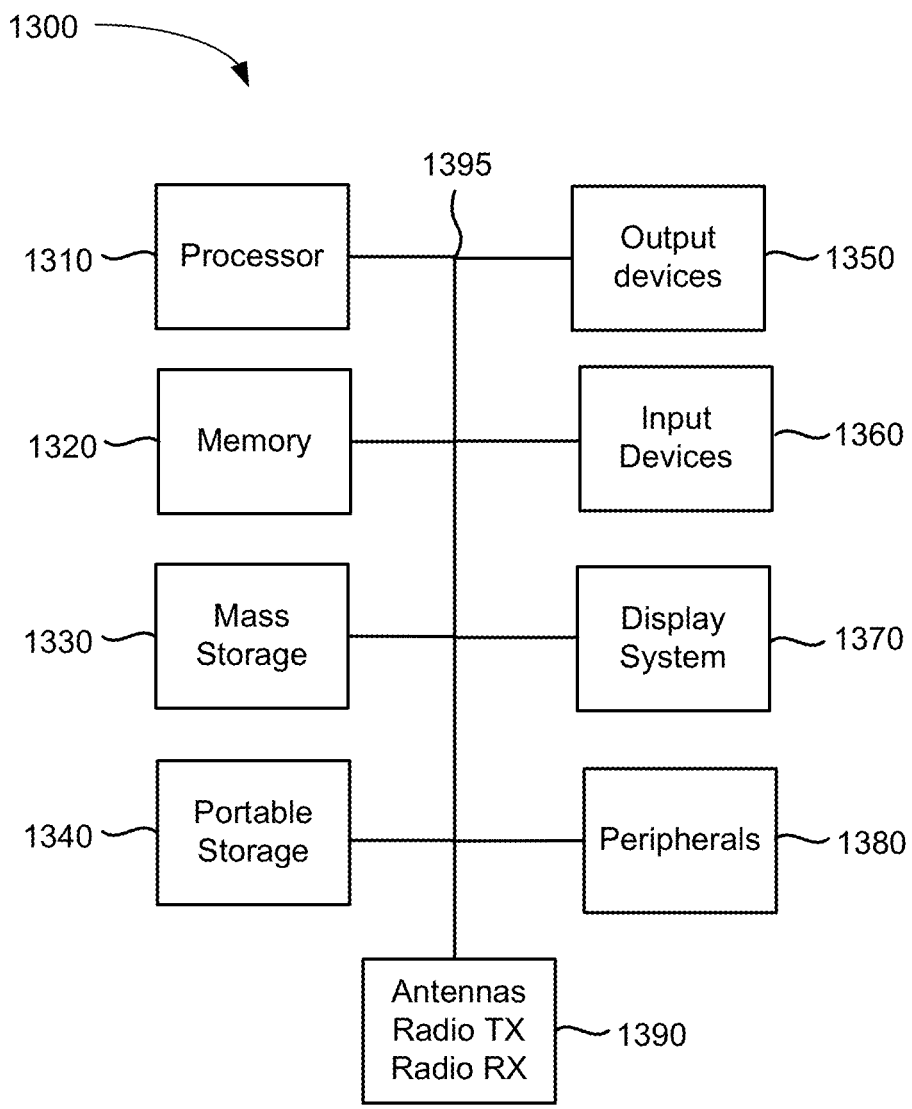
FIG. 13 is a block diagram of a system for implementing machines that implement the present technology.

FIG. 13 is a block diagram of a system for implementing machines that implement the present technology. System 1300 of FIG. 13 may be implemented in the contexts of the likes of machines that implement application program monitoring system 110, machines that host applications 130 and 136, network server 145, manager 160, servers 170 and 180, datastore 190, and client device 195. The computing system 1300 of FIG. 13 includes one or more processors 1310 and memory 1320. Main memory 1320 stores, in part, instructions and data for execution by processor 1310. Main memory 1320 can store the executable code when in operation. The system 1300 of FIG. 13 further includes a mass storage device 1330, portable storage medium drive(s) 1340, output devices 1350, user input devices 1360, a graphics display 1370, and peripheral devices 1380.

The components shown in FIG. 13 are depicted as being connected via a single bus 1390. However, the components may be connected through one or more data transport means. For example, processor unit 1310 and main memory 1320 may be connected via a local microprocessor bus, and the mass storage device 1330, peripheral device(s) 1380, portable storage device 1340, and display system 1370 may be connected via one or more input/output (I/O) buses.

Mass storage device 1330, which may be implemented with a magnetic disk drive, an optical disk drive, a flash drive, or other device, is a non-volatile storage device for storing data and instructions for use by processor unit 1310. Mass storage device 1330 can store the system software for implementing embodiments of the present invention for purposes of loading that software into main memory 1320.

Portable storage device 1340 operates in conjunction with a portable non-volatile storage medium, such as a floppy disk, compact disk or Digital video disc, USB drive, memory card or stick, or other portable or removable memory, to input and output data and code to and from the computer system 1300 of FIG. 13. The system software for implementing embodiments of the present invention may be stored on such a portable medium and input to the computer system 1300 via the portable storage device 1340.

Input devices 1360 provide a portion of a user interface. Input devices 1360 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 1300 as shown in FIG. 13 includes output devices 1350. Examples of suitable output devices include speakers, printers, network interfaces, and monitors.

Display system 1370 may include a liquid crystal display (LCD) or other suitable display device. Display system 1370 receives textual and graphical information and processes the information for output to the display device. Display system 1370 may also receive input as a touch-screen.

Peripherals 1380 may include any type of computer support device to add additional functionality to the computer system. For example, peripheral device(s) 1380 may include a modem or a router, printer, and other device.

The system of 1300 may also include, in some implementations, antennas, radio transmitters and radio receivers 1390. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 1300 of FIG. 13 are those typically found in computer systems that may be suitable for use with embodiments of the present invention and are intended to represent a broad category of such computer components that are well known in the art. Thus, the computer system 1300 of FIG. 13 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for automatically continuously monitoring a first application; comprising:
   receiving, by a second application on a server, data from a delegate on a remote machine, the delegate collecting data from a node within the first application that is currently executing;
   performing a first comparison of the collected data to past data collected from the first application during a first period of time to determine if an application performance associated with the collected data is acceptable;
   performing a first analysis of the collected data by a pattern recognizing machine stored in memory of the server, the first analysis performed based on an output of the pattern recognizing machine that is associated with performance of the first application during the first period of time;
   performing a second comparison of the collected data to portions of data stored in the memory and determined to be associated with unacceptable performance of the first application during a second time period prior to the first period; and
   reporting a performance indication for the first application based on the first comparison, the first analysis, and the second comparison.

2. The method of claim 1, wherein the comparison includes comparing the collected data to a portion of the past collected data to determine if the two portions are within a tolerance value of each other.

3. The method of claim 1, wherein the pattern recognizing machine includes a neural network.

4. The method of claim 1, wherein the first analysis includes determining if a reconstruction error based on an input of the pattern recognizing machine and the output of the reconstruction machine are within a tolerance of a second reconstruction error.

5. The method of claim 1, wherein the second comparison include comparing the collected data to one or more cached data chunks identified as unexpected data.

6. The method of claim 1, wherein the comparison includes:
   determining that the collected data matches a first cached data chunk of the one or more cached data chunks; and
   increasing a count for the first cached data chunk.

7. The method of claim 6, further comprising:
   determining the count for the first cached data chunk is greater than a threshold; and
   setting the first cached data chunk as good data within the past collected data used in the first comparison.

8. The method of claim 1, wherein reporting includes providing a single score for the first application based on a plurality of scores associated with a plurality of application metrics.

9. A non-transitory computer readable storage medium having embodied thereon a program, the program being executable by a processor to perform a method for automatically continuously monitoring an application, the method comprising:
   receiving data from a delegate on a remote machine, the delegate collecting data from a node within the application that is currently executing;
   performing a first comparison of the collected data to past data collected from the application during a first period of time to determine if an application performance associated with the collected data is acceptable;
   performing a first analysis of the collected data by a pattern recognizing machine stored in memory of a server, the first analysis performed based on an output of the pattern recognizing machine that is associated with performance of the application during the first period of time;
   performing a second comparison of the collected data to portions of data stored in the memory and determined to be associated with unacceptable performance of the application during a second time period prior to the first period; and reporting a performance indication for the application based on the first comparison, the first analysis, and the second comparison.

10. The non-transitory computer readable storage medium of claim 9, wherein the comparison includes comparing the collected data to a portion of the past collected data to determine if the two portions are within a tolerance value of each other.

11. The non-transitory computer readable storage medium of claim 9, wherein the pattern recognizing machine includes a neural network.

12. The non-transitory computer readable storage medium of claim 9, wherein the first analysis includes determining if a reconstruction error based on an input of the pattern recognizing machine and the output of the reconstruction machine are within a tolerance of a second reconstruction error.

13. The non-transitory computer readable storage medium of claim 9, wherein the second comparison include comparing the collected data to one or more cached data chunks identified as unexpected data.

14. The non-transitory computer readable storage medium of claim 9, wherein the comparison includes:
   determining that the collected data matches a first cached data chunk of the one or more cached data chunks; and
   increasing a count for the first cached data chunk.

15. The non-transitory computer readable storage medium of claim 14, further comprising:
   determining the count for the first cached data chunk is greater than a threshold; and
   setting the first cached data chunk as good data within the past collected data used in the first comparison.

16. The non-transitory computer readable storage medium of claim 9, wherein reporting includes providing a single score for the application based on a plurality of scores associated with a plurality of application metrics.

17. A system for automatically continuously monitoring a first application; comprising:
   a server including a memory and a processor; and
   one or more modules stored in the memory and executed by the processor to receive, by a second application on the server, data from a delegate on a remote machine, the delegate collecting data from a node within the first application that is currently executing, perform a first comparison of the collected data to past data collected from the first application during a first period of time to determine if an application performance associated with the collected data is acceptable, perform a first analysis of the collected data by a pattern recognizing machine stored in the memory of the server, the first analysis performed based on an output of the pattern recognizing machine that is associated with performance of the first application during the first period of time, perform a second comparison of the collected data to portions of data stored in the memory and determined to be associated with unacceptable performance of the first application during a second time period prior to the first period, and report a performance indication for the first application based on the first comparison, the first analysis, and the second comparison.

18. The system of claim 17, wherein the comparison includes comparing the collected data to a portion of the past collected data to determine if the two portions are within a tolerance value of each other.

19. The system of claim 17, wherein the pattern recognizing machine includes a neural network.

20. The system of claim 17, wherein the first analysis includes determining if a reconstruction error based on an input of the pattern recognizing machine and the output of the reconstruction machine are within a tolerance of a second reconstruction error.

* * * * *